US012804571B2

(12) United States Patent
Xu et al.

(10) Patent No.: US 12,804,571 B2
(45) Date of Patent: Nov. 17, 2026

(54) METHOD AND APPARATUS FOR TIMING ADVANCE COMPENSATION

(71) Applicant: LENOVO (BEIJING) LIMITED, Beijing (CN)

(72) Inventors: Min Xu, Beijing (CN); Haiming Wang, Beijing (CN); Lianhai Wu, Beijing (CN); Jing Han, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 511 days.

(21) Appl. No.: 18/040,601

(22) PCT Filed: Aug. 4, 2020

(86) PCT No.: PCT/CN2020/106809
§ 371 (c)(1),
(2) Date: Feb. 3, 2023

(87) PCT Pub. No.: WO2022/027230
PCT Pub. Date: Feb. 10, 2022

(65) Prior Publication Data
US 2024/0292468 A1 Aug. 29, 2024

(51) Int. Cl.
*H04W 56/00* (2009.01)
*H04W 76/20* (2018.01)
*H04W 74/0833* (2024.01)
*H04W 74/0836* (2024.01)

(52) U.S. Cl.
CPC ....... *H04W 56/0045* (2013.01); *H04W 76/20* (2018.02); *H04W 74/0833* (2013.01); *H04W 74/0836* (2024.01)

(58) Field of Classification Search
CPC ......... H04W 74/0836; H04W 56/0045; H04W 76/20; H04W 74/0833; H04B 7/18563; H04B 17/364
See application file for complete search history.

(56) References Cited

U.S. PATENT DOCUMENTS

2015/0172973 A1* 6/2015 Jeong ................ H04W 36/0033 370/331
2019/0274121 A1* 9/2019 Wu ........................ H04L 5/0092
(Continued)

FOREIGN PATENT DOCUMENTS

CN 107371235 A 11/2017
CN 110831197 A 2/2020
(Continued)

OTHER PUBLICATIONS

ZTE et al. "Report of Email Discussion [107#60] [NR/NTN] RACH capacity evaluation and procedures" 3GPP TSG-RAN WG2 Meeting #107bis, R2-1912664, Oct. 18, 2019; pp. 1-29.
(Continued)

*Primary Examiner* — Steven Hieu D Nguyen
(74) *Attorney, Agent, or Firm* — AMPACC Law Group, PLLC

(57) ABSTRACT

Embodiments of the present application relate to a method and apparatus for timing advance (TA) compensation. An exemplary method includes: receiving configuration information indicating a reference power; estimating a first TA between the UE and a first BS based on the reference power, and compensating a TA based on the estimated first TA when initiating a random assess procedure to the first BS. Embodiments of the present application can efficiently compensate the TA in scenarios (e.g., NTN) with large propagation delay.

20 Claims, 9 Drawing Sheets

(56) References Cited

U.S. PATENT DOCUMENTS

| | | | | |
|---|---|---|---|---|
| 2019/0274131 | A1* | 9/2019 | Yamazaki | H04W 72/21 |
| 2019/0349077 | A1* | 11/2019 | Alasti | H04B 7/18513 |
| 2019/0387441 | A1* | 12/2019 | Koskela | H04W 36/0077 |
| 2020/0107369 | A1* | 4/2020 | Jeon | H04W 74/006 |
| 2020/0146054 | A1 | 5/2020 | Jeon et al. | |
| 2020/0221504 | A1 | 7/2020 | Cirik et al. | |
| 2020/0236715 | A1* | 7/2020 | Akkarakaran | H04W 40/38 |
| 2020/0252967 | A1* | 8/2020 | Ozturk | H04W 74/006 |
| 2021/0105761 | A1* | 4/2021 | Cheng | H04B 7/18504 |
| 2022/0217790 | A1* | 7/2022 | Qiu | H04W 56/005 |
| 2022/0353855 | A1* | 11/2022 | Li | H04W 74/0891 |
| 2023/0010343 | A1* | 1/2023 | Li | H04B 7/18513 |
| 2023/0143073 | A1* | 5/2023 | Li | H04L 5/1469 370/329 |

FOREIGN PATENT DOCUMENTS

| | | | | |
|---|---|---|---|---|
| CN | 111447554 A | | 7/2020 | |
| WO | WO-2021062666 A1 | * | 4/2021 | H04B 7/18513 |

OTHER PUBLICATIONS

Ericsson. "RRM requirements for RRC connected mode in high speed scenarios" 3GPP TSG-RAN WG4 Meeting #78bis, R4-161722, Apr. 15, 2016; pp. 1-5.

International Search Report and Written Opinion dated Apr. 27, 2021 for International Application No. PCT /CN2020/106809.

* cited by examiner

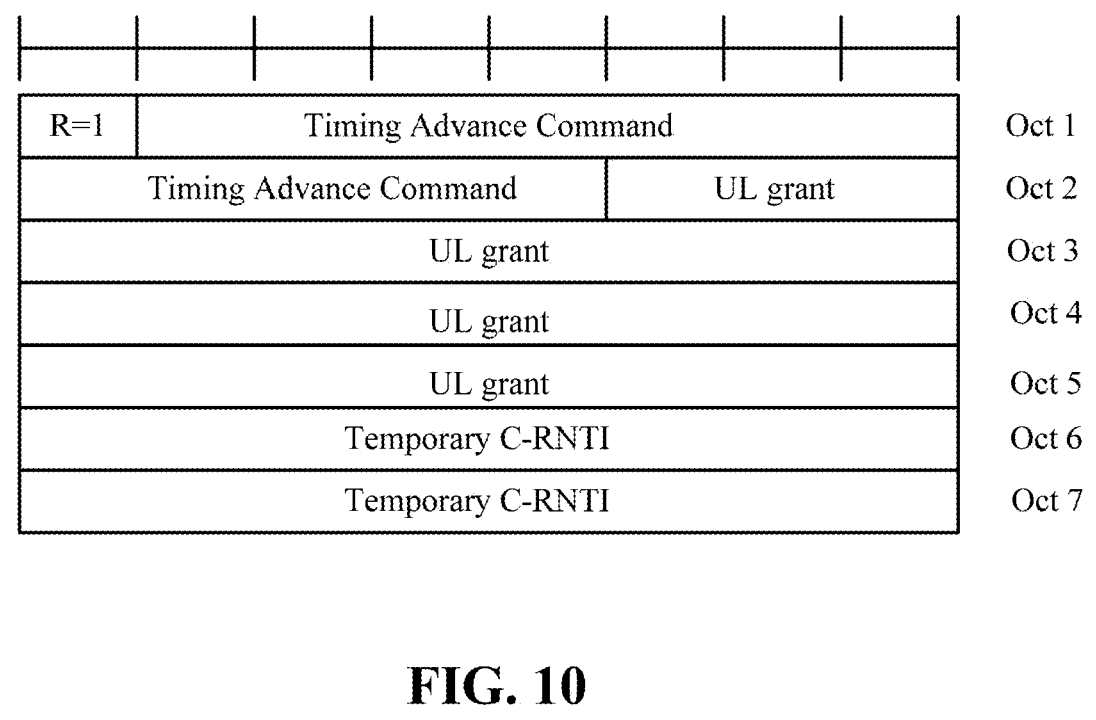

| | | | |
|---|---|---|---|
| R=1 | Timing Advance Command | | Oct 1 |
| Timing Advance Command | | UL grant | Oct 2 |
| UL grant | | | Oct 3 |
| UL grant | | | Oct 4 |
| UL grant | | | Oct 5 |
| Temporary C-RNTI | | | Oct 6 |
| Temporary C-RNTI | | | Oct 7 |

FIG. 10

METHOD AND APPARATUS FOR TIMING ADVANCE COMPENSATION

CROSS REFERENCE TO RELATED APPLICATIONS

This application is a national phase entry of International Application No. PCT/CN2020/106809, filed on Aug. 4, 2020, which is incorporated by reference in its entirety.

TECHNICAL FIELD

Embodiments of the present application generally relate to wireless communication technology, especially to a method and apparatus for timing advance (TA) compensation.

BACKGROUND

Timing Advance (TA) is used to adjust the uplink (UL) frame timing relative to the downlink (DL) frame timing such that the timings of the UL frame and DL frame timing are aligned at a base bastion. For example, a TA of a user equipment (UE) is twice the value of the propagation delay between a BS and a UE. Different UEs (e.g. a UE at the cell center and a UE at the cell edge) usually have different TAs.

In new radio (NR), a non-terrestrial network (NTN) may include a geostationary earth orbiting (GEO) scenario and a low earth orbiting (LEO) scenario. In the GEO scenario, the round-trip delay (for example, propagation delay) can be several hundred milliseconds. In the LEO scenario, the round-trip propagation delay can be tens of milliseconds. That is, the round-trip delay in the NTN is beyond the range of current TA compensation via a medium access control (MAC) random access response (RAR) and timing advance command (TAC) MAC control element (CE). As a result, the TA cannot be fully compensated at the UE via MAC RAR when performing a random access procedure. Additionally, it requires significant signalling overhead to compensate the TA in the NTN via TAC MAC CE.

Besides, satellite movement is common in the NTN except for GEO scenario. As a result, the TA which needs to be compensated is dynamic. Enhancement for TA compensation has to take satellite/cell movement into consideration, e.g. how to indicate the TA efficiently and avoid frequent TA update or complex TA calculation needs to be further considered.

Given the above, the industry desires an improved technology for TA compensation, so as to efficiently compensate the TA in scenarios (e.g. NTN) with large propagation delay.

SUMMARY OF THE APPLICATION

Some embodiments of the present application at least provide a technical solution for TA compensation.

According to some embodiments of the present application, a method may include: receiving configuration information indicating a reference power; estimating a first TA between the UE and a first BS based on the reference power; and compensating a TA based on the estimated first TA when initiating a random assess procedure to the first BS.

According to some other embodiments of the present application, a method may include: transmitting configuration information indicating a reference power to a UE, wherein the reference power is used for compensating a TA of the UE when initiating a random assess procedure with the first BS.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for TA compensation. Accordingly, embodiments of the present application can efficiently compensate the TA in scenarios (e.g. NTN) with large propagation delay.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 5(*b*) illustrates a schematic diagram of a NTN with transparent transmission according to some embodiments of the present application;

FIG. 10 illustrates another example of an extended MAC RAR according to some other embodiments of the present application;

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present application are also applicable to similar technical problems.

In a terrestrial network, TA is used to adjust the UL frame timing relative to the DL frame timing such that the timings of the UL frame and DL frame timing are aligned at a base bastion. For example, a TA of a UE is twice the value of the propagation delay between a BS and a UE. Different UEs (e.g. a UE at the cell center and a UE at the cell edge) usually have different TAs.

Figure 1A:
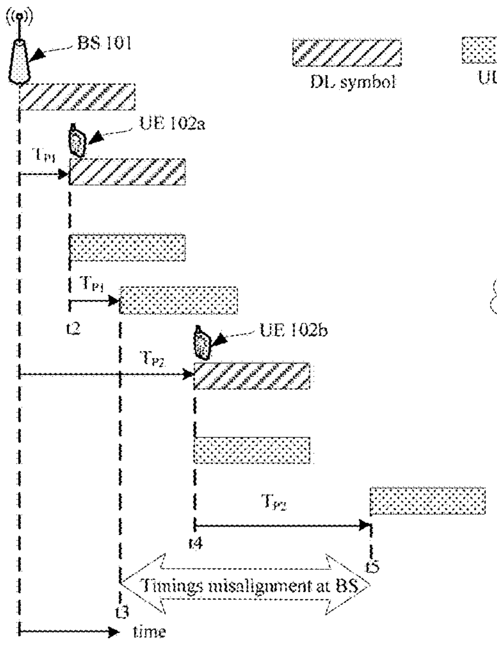
FIGS. 1(*a*) and 1(*b*) illustrate an example of timing alignment according to some embodiments of the present application.
Figure 1:
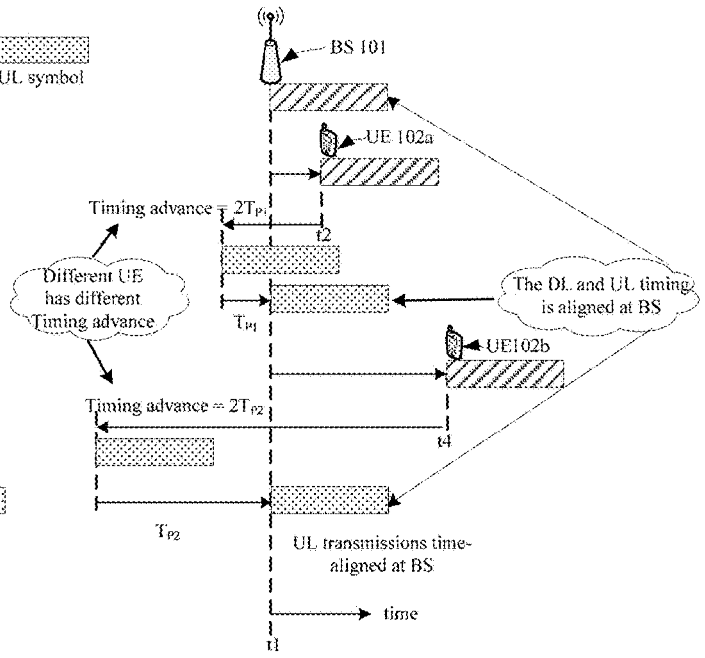

For example, FIG. 1(*a*) and FIG. 1(*b*) illustrate an example of timing alignment according to some embodiments of the present application;

FIG. 1(*a*) illustrates a scenario without TA compensation, whereas FIG. 1(*b*) illustrates a scenario without TA.

Referring to FIG. 1(*a*), at time t1, a BS 101 may transmit a DL symbol to a UE 102*a* close to the BS. After a short propagation delay $T_{P1}$, at time t2, the DL symbol may be received at the UE 102*a*. Then, at time t2, the UE 102*a* may transmit a UL symbol to the BS 101, after a short propagation delay $T_{P1}$, at time t3, the UL symbol may be received at the BS 101. Similarly, at time t1, a BS 101 may transmit a DL symbol to a UE 102*b* father from the BS. After a long propagation delay $T_{P2}$, at time t4, the DL symbol may be received at the UE 102*b*. Then, at time t4, the UE 102*b* may transmit a UL symbol to the BS 101, after a long propagation delay $T_{P2}$, at time t5, the UL symbol may be received at the BS 101. That is, in FIG. 1(*a*), the timings of the UL symbols from two UEs and the DL symbol are misalignment at the BS.

In contrast, FIG. 1(*b*) illustrates performing TA compensation such that the timings of the DL symbol and the UL symbol are misalignment at the BS. In FIG. 1(*b*), the TA for the UE 102*a* may be determined as $2T_{P1}$, the UE 102*a* may compensate the TA when transmitting the UL symbol, for example, the UE 102*a* may transmit the UL symbol at a time $t2-2T_{P1}$, such that the BS 101 may receive the UL symbol at time t1 (i.e., $t2-T_{P1}$). Similarly, the TA for the UE 102*b* may be determined as $2T_{P2}$, the UE 102*b* may compensate the TA when transmitting the UL symbol, for example, the UE 102*b* may transmit the UL symbol at a time $t4-2T_{P2}$, such that the BS 101 may receive the UL symbol at time t1 (i.e., $t4-T_{P2}$). As a result, the timings of the UL symbols from two UEs and the DL symbol are misalignment at the BS.

Figure 2:
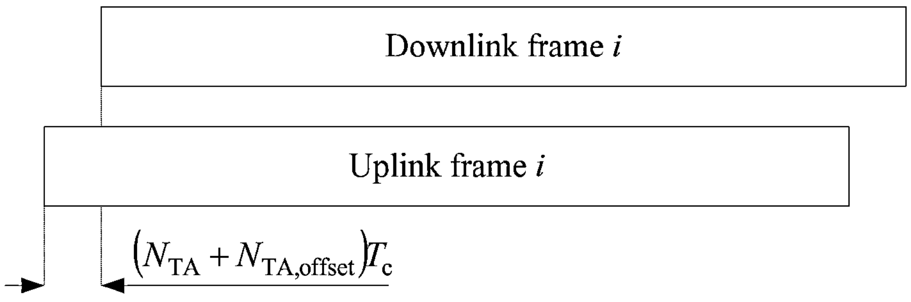
FIG. 2 illustrates an example of uplink-downlink timing relation according to some embodiments of the present application.

According to some embodiments of the present application, the TA is derived from the UL received timing and sent by the BS to the UE. UE uses the TA to advance/delay its timings of transmissions to the BS so as to compensate for propagation delay, and thus the transmissions from different UEs are received within a receiver window of the BS. For example, FIG. 2 illustrates an example of uplink-downlink timing relation according to some embodiments of the present application. Referring to FIG. 2, in NR, UL frame number for transmission from the UE shall start $(N_{TA}+N_{TA,offset})T_c$ before the start of the corresponding DL frame at the UE.

In an embodiment of the present application, as specified in 3GPP standard document TS 38.133, $Tc=1/(\Delta f_{max}\cdot N_f)$ where $\Delta f_{max}$=480 kHz and $N_f$=4096.

In an embodiment of the present application, the BS may indicate a value of $N_{TA,offset}$ in a system information block (SIB1). For example, as defined in 3GPP standard document TS38.331, $N_{TA,offset}$ is provided in SIB1 by a parameter n-TimingAdvanceOffset with the following possible values:

n-TimingAdvanceOffset ENUMERATED {n0, n25600, n39936} OPTIONAL, —Need S

If the UE is not provided with n-TimingAdvanceOffset for a serving cell, the UE may determine a default value $N_{TA\_offset}$ of the timing advance offset for the serving cell as described in the following table 1, which is the same as Table 7.1.2-2 as defined in 3GPP standard document TS 38.133.

TABLE 1

The Value of $N_{TA,\ offset}$

| Frequency range and band of cell used for uplink transmission | $N_{TA,\ offset}$ (Unit: Tc) |
|---|---|
| FR1 FDD band without LTE-NR coexistence case or FR1 TDD band without LTE-NR coexistence case | 25600 (Note 1) |
| FR1 FDD band with LTE-NR coexistence case | 0 (Note 1) |
| FR1 TDD band with LTE-NR coexistence case | 39936 (Note 1) |
| FR2 | 13792 |

Note 1:
The UE identifies $N_{TA,\ offset}$ based on the information n-TimingAdvanceOffset as specified in TS 38.331 [2]. If UE is not provided with the information n-TimingAdvanceOffset, the default value of $N_{TA,\ offset}$ is set as 25600 for FR1 band. In case of multiple UL carriers in the same TAG, UE expects that the same value of n-TimingAdvanceOffset is provided for all the UL carriers according to clause 4.2 in TS 38.213 [3] and the value 39936 of $N_{TA,\ offset}$ can also be provided for a FDD serving cell.
Note 2:
Void For $N_{TA}$, there are two possible ways for a BS to provide a value of the $N_{TA}$ to UE. In an embodiment of the present application, the value of the $N_{TA}$ may be provided to the UE during a random access procedure. The BS may derive the TA by measuring the received random access preamble and sends the value to UE via the timing advance command (TAC) field in MAC RAR.

Figure 3:
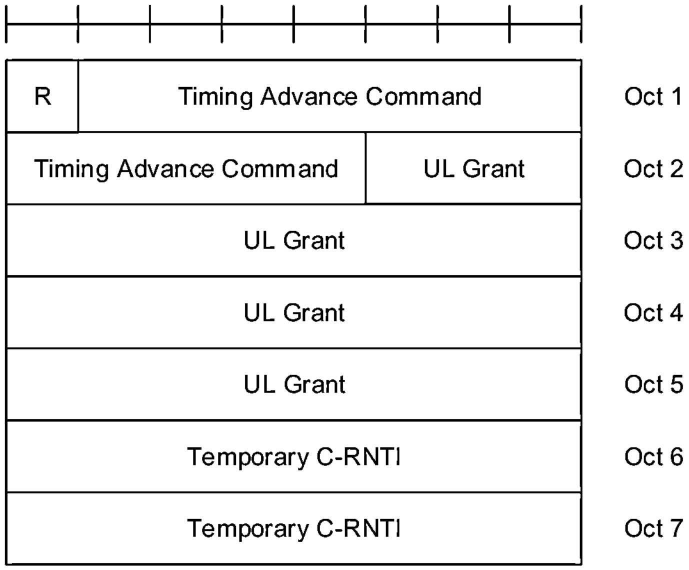
FIG. 3 illustrates an example of MAC RAR according to some embodiments of the present application.

FIG. 3 illustrates an example of MAC RAR according to some embodiments of the present application. Referring to FIG. 3, the size of the MAC RAR is 8*7 bits. The MAC RAR includes a reserved field with 1 bit, which is represented by "R" in FIG. 3, a TAC field with 12 bits, a UL grant field with 3+8*3 bits, and a temporary cell-radio network temporary identifier (C-RNTI) field with 8*2 bits.

The maximum TA in NR which can be compensated via MAC RAR is calculated in Table 2, which is the same as Table 7.2.1.1.1.2-4 as specified in TR 38.821

TABLE 2

Maximum timing advance compensated via MAC RAR

| μ | SCS (sub-carrier space) = 2 μ · 15 kHz | Maximum TA compensated via MAC RAR |
|---|---|---|
| 0 | 15 | 2 ms |
| 1 | 30 | 1 ms |

TABLE 2-continued

| Maximum timing advance compensated via MAC RAR | | |
|---|---|---|
| μ | SCS (sub-carrier space) = 2 μ · 15 kHz | Maximum TA compensated via MAC RAR |
| 2 | 60 | 0.5 ms |
| 3 | 120 | 0.27 ms |
| 4 | 240 | 0.15 ms |

In another embodiment of the present application, when the UE is in a RRC_CONNECTED state, the value of the $N_{TA}$ may be refined through a TAC MAC CE. The BS may derive the TA by measuring the received random access preamble and sends the value to UE via the TAC field in TAC MAC CE.

Figure 4:
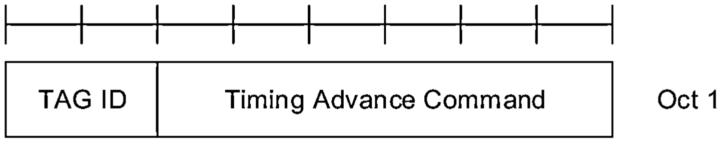
FIG. 4 illustrates an example of TAC MAC CE according to some embodiments of the present application.

For example, FIG. 4 illustrates an example of TAC MAC CE according to some embodiments of the present application. Referring to IG. 4, the size of TAC MAC CE is 8 bits. The TAC MAC CE includes a field with 2 bits to indicate a timing advance group (TAG) ID and a TAC field with 6 bits.

The maximum TA which can be adjusted via TAC is calculated in the following Table 3, which is the same as Table 7.2.1.1.1.2-5 as specified in TR 38.821, wherein the SCS is the subcarrier spacing of the UE.

TABLE 3

| Maximum timing advance compensated via TAC MAC CE | | |
|---|---|---|
| μ | SCS = 2 μ · 15 kHz | Maximum TA compensated via Timing Advance Command MAC CE |
| 0 | 15 | 0.017 ms |
| 1 | 30 | 0.008 ms |
| 2 | 60 | 0.004 ms |
| 3 | 120 | 0.002 ms |
| 4 | 240 | 0.001 ms |

The 3GPP NR NTN may include a GEO scenario and a LEO scenario. During the study item phase of 3GPP NR NTN, reference scenario parameters for GEO and LEO satellites including the maximum round trip delay and the maximum differential delay within a cell are given as in Table 4, which is part of Table 4.2-2 as specified in TR 38.821.

TABLE 4

| Reference scenario parameters | | |
|---|---|---|
| Scenarios | GEO (Scenario A and B) | LEO (Scenario C & D) |
| Orbit type | notional station keeping position fixed in terms of elevation/azimuth with respect to a given earth point | circular orbiting around the earth |
| Altitude | 35,786 km | 600 km, 1200 km |
| Max Round Trip Delay (propagation delay only) | Scenario A: 541.46 ms (service and feeder links) Scenario B: 270.73 ms (service link only) | Scenario C (transparent payload: service and feeder links): 25.77 ms (600 km), 41.77 ms (1200 km) Scenario D (regenerative payload: service link only): 12.89 ms (600 km), 20.89 ms (1200 km) |

TABLE 4-continued

| Reference scenario parameters | | |
|---|---|---|
| Scenarios | GEO (Scenario A and B) | LEO (Scenario C & D) |
| Max differential delay within a cell | 10.3 ms | 3.12 ms (600 km), 3.18 ms (1200 km) |

According to the above table 4, it can be seen that the legacy TA compensation in NR for a terrestrial network (e.g., table 2 and table 3) is not enough for TA compensation in the NTN. For example, even for NTN LEO scenario D at 600 km orbit (which is the best case), the round-trip delay (i.e., 12.89 ms) can be more than 6 times as much as the maximum TA (i.e., 2 ms) compensated via MAC RAR for SCS=15 kHz. Even if a common service link TA in an NTN cell can be provided by $N_{TA,offset}$ in SIB1, the differential TA within a cell (i.e. differential delay, which is 3.12 ms~10.3 ms) is still out of the range of TA compensation (i.e., 2 ms) via MAC RAR. The same issue exists for TA compensation (e.g. 0.017 ms) via the TAC MAC CE for SCS=15 kHz.

That is, the round-trip delay in the NTN is beyond the range of current TA compensation via a MAC RAR and TAC MAC control element CE. As a result, the TA cannot be fully compensated at the UE via MAC RAR when performing a random access procedure. Additionally, it requires significant signaling overhead to compensate the TA in the NTN via TAC MAC CE.

Besides, satellite movement is common in the NTN except for GEO scenario. As a result, the TA which needs to be compensated is dynamic. Enhancement for TA compensation has to take satellite/cell movement into consideration, e.g. how to indicate the TA efficiently and avoid frequent TA update or complex TA calculation needs to be further considered.

Several solutions may be provided for TA compensation in the NTN networks.

Figure 5A:
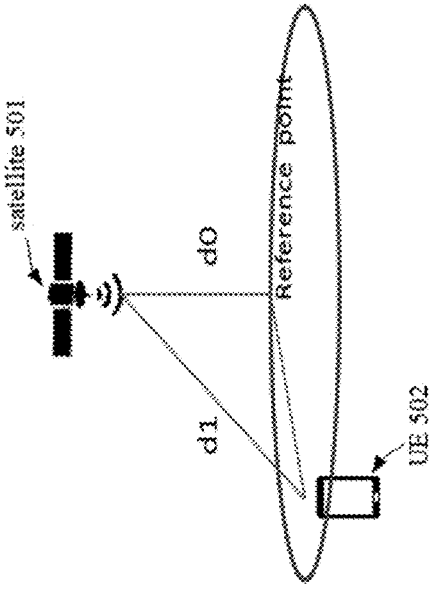
FIG. 5(*a*) illustrates a schematic diagram of a NTN with non-transparent transmission according to some embodiments of the present application.
Figure 5B:
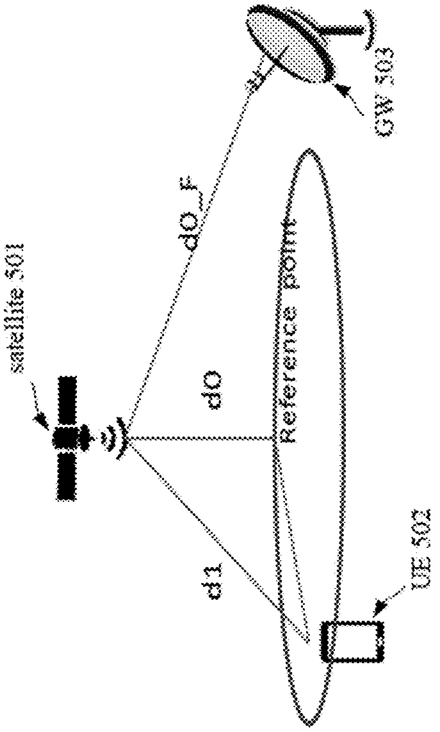

FIG. 5(*a*) illustrates a schematic diagram of the NTN with non-transparent transmission according to some embodiments of the present application. As shown in FIG. 5(*a*), the NTN with non-transparent transmission includes at least one satellite 501 and at least one UE 502. In particular, the NTN includes one satellite 501 and one UE 502 for illustrative purpose. Although a specific number of satellite 501 and UE 502 are depicted in FIG. 5(*a*), it is contemplated that any number of satellites 501 and UEs 502 may be included in the NTN. The satellite 501 may be function as a BS and includes part or all functions of a BS. In FIG. 5(*a*), a service link TA may be determined based on a distance d1, a common service link TA may be determined based on a distance d0, a UE specific TA may be determined based on d1−d0.

FIG. 5(*b*) illustrates a schematic diagram of the NTN with transparent transmission according to some embodiments of the present application. The transparent transmission may also refer to a bent-pipe transmission. As shown in FIG. 5(*b*), the NTN with transparent transmission includes at least one satellite 501, at least one UE 502, and at least one gateway (GW) 503. In particular, the NTN includes one satellite 501, one UE 502 and one GW 503 for illustrative purpose. Although a specific number of satellite 501, UE 502, and GW 503 are depicted in FIG. 5(*b*), it is contemplated that any number of satellites 501, UEs 502, and the GWs 503 may be included in the NTN. The GW 503 may be function as a BS, and the satellite 501 may be function as an antenna unit of the BS. That is, for the data transmitted to the UE 502, the GW 503 may first transmit it to the satellite 501, and then the satellite 501 may transmit it to the UE 502. Similarly, for the data transmitted to the GW 503, the UE 502 may first transmit it to the satellite 501, and then the satellite 501 may transmit it to the GW 503. In the case (b), a feeder link TA may be determined based on a distance d0_F, a service link TA may be determined based on a distance d1+d0_F, a common service link TA may be determined based on a distance d0+d0_F, a UE specific TA may be determined based on d1−d0.

The UE(s) 502 in FIG. 5(*a*) or 5(*b*) may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 502(*s*) may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 502(*s*) may include wearable devices, such as smart watches, fitness bands, optical head-mounted displays, or the like. Moreover, the UE 502(*s*) may be referred to as a subscriber unit, a mobile, a mobile station, a user, a terminal, a mobile terminal, a wireless terminal, a fixed terminal, a subscriber station, a user terminal, or a device, or described using other terminology used in the art.

For a UE 502 without location information, broadcasting a common service link TA for NTN or extending the value range of the existing TA offset broadcast in system information is the baseline for initial timing advance during random access procedure in NTN. Compensating the common service link TA at network side by implementation can be discussed in work item (WI) phase of the NTN. The UE specific TA may be compensated via the TAC field in RAR.

Figure 6:
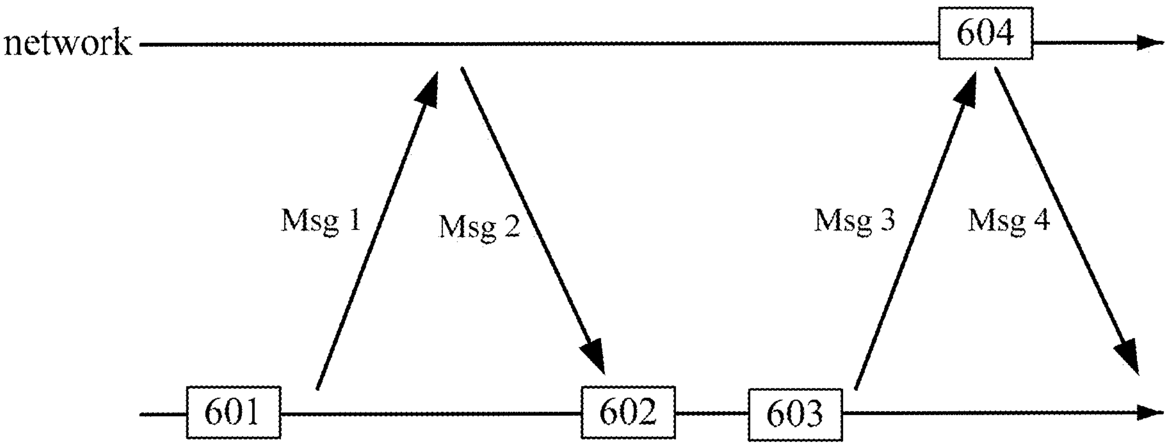
FIG. 6 illustrates an example of performing initial timing advance during a 4-step random access procedure according to some embodiments of the present application.

For a UE 502 with location information, the example illustrated in FIG. 6 may be considered as a baseline for UE to perform initial timing advance during a 4-step random access procedure.

Referring to FIG. 6, at step 601, before sending an Msg1 (i.e. random access preamble) to the network, the UE may estimate the timing advance with respect to the satellite. When the UE receives the RAR in Msg2, it applies a timing advance correction for the UE-based estimation at step 602. Since the UE is now estimating the timing advance, the UE may now both underestimate and overestimate the timing advance. At step 603, the UE receives the scheduling information for Msg3 transmitted by the network without knowing the absolute value of the timing advance. At step 604, the network receives Msg3 and gets to know the timing advance of the UE. At this point both UE and network are both aware of the UE-specific timing advance.

For the UE 502 with location information, another option is that a UE may only compensate its specific TA when sending Msg1, where the UE specific TA is determined based on d1−d0. Network compensates the common service link TA, where the common service link TA is determined based on the distance between a reference point and the BS (for example, d0 in the regenerative transmission scenario and d0+d0_F in the bent-pipe transmission scenario).

According to some embodiments of the present application, the following solutions A1)-A3) may be used for service link TA compensation (e.g., d1) before transmitting a random access preamble at UE.

A1): the UE may calculate service link TA (e.g., d1) based on the UE location and satellite location/ephemeris.

A2): the BS may broadcast the common service link TA (e.g., based on d0) in a cell (e.g. as part of $N_{TA,offset}$) and a reference location to help UE calculate UE-specific service link TA (e.g., d1−d0). This solution may need an extension of the value range of the existing TA offset broadcasted in system information (e.g., $N_{TA,offset}$) may be needed.

A3): the BS may compensate the common service link TA (e.g., d0) in a cell and broadcast a reference location to help UE calculate the UE specific service link TA (e.g., the d1−d0).

According to some other embodiments of the present application, the following solutions B1)-B3) may be used for feeder link TA compensation (e.g., d0_F) in the transparent mode before transmitting a random access preamble at UE.

B1): the BS may broadcast the gateway position so that the UE can calculate the feeder link TA (e.g., d0_F).

B2): the BS may broadcast the feeder link TA (i.e. d0_F) in a cell (e.g. as part of $N_{TA,offset}$). This solution may need to an extension of the value range of the existing TA offset broadcasted in system information (e.g., $N_{TA,offset}$).

B3): the BS itself may compensate the feeder link TA (i.e. d0_F) in a cell.

According to some other embodiments of the present application, the following solution C1) may be used for TA compensation after preamble transmission.

C1): Extend the value range for TA compensation via MAC RAR and/or via TAC MAC CE.

For the service link, solution A1) can work independently without broadcasting the common service link TA. UE location and satellite location/ephemeris are needed in the same layer at UE, wherein the satellite ephemeris can be provided by system information. Solution A2) needs to define a new parameter for the common service link TA or extend the value range of the existing TA offset. UE location, the reference location and the common service link TA are needed in the same layer at UE. Solution A3) is similar to Solution A2) in UE-specific service link TA. However, a reference location itself may not be enough to calculate UE-specific service link TA (i.e. d1−d0). Other information e.g. elevation angle or even the common service link TA may also be needed. Besides, the network needs to manage the common service link TA offset between the DL and UL frame. The impact of satellite/cell movement on these solutions is non-negligible as the distance between UE and satellite or the reference location will change, resulting in update of calculation or broadcasting.

For the feeder link, Solution B1) requires UE to do the calculation so that gateway location and satellite location/ephemeris are needed in the same layer at UE. Solution B2) needs to define a new parameter for the feeder link TA or extend the value range of the existing TA offset. In Solution B3), the network needs to manage the feeder link TA offset between the DL and UL frame. The impact of satellite/cell movement on these solutions is non-negligible as the distance between gateway and satellite will change, resulting in update of calculation or broadcasting.

For Solution C1), extension of the TAC field in MAC RAR and/or TAC MAC CE) is needed.

The following table 5 shows a comparison of solutions for TA compensation before preamble transmission at UE.

TABLE 5 comparison of solutions for TA compensation before preamble transmission at UE

| Solutions | Descriptions | Pros | Cons |
|---|---|---|---|
| A1) | Calculate total service link TA based on UE location and satellite location/ephemeris. | Total service link TA can be calculated directly. Satellite ephemeris is relatively stable (no change as the satellite moves on the same orbit). | Need UE & satellite location/ephemeris at the same layer. Expose satellite location. Large computational burden (including satellite motion) and power consumption. |
| A2) | Broadcast common service link TA and reference location for UE-specific service link TA calculation. | Can reuse $N_{TA,\ offset}$ (no need to define another parameter). No need to expose satellite location. Less computational burden than A1). | Need UE & reference location & common service link TA at the same layer. Extension of $N_{TA,\ offset}$ (standard impact). The common service link TA or the reference location needs to update due to satellite motion for steerable beam or moving beam scenarios. |
| A3) | gNB compensates common service link TA and broadcasts reference location for UE-specific service link TA calculation. | No need to indicate common service link TA. No need to expose satellite location. Less computational burden than A1). | Need UE & reference location & other information (could be common service link TA) at the same layer. The reference location needs to update due to satellite motion for moving beam scenario. Other information needs to update due to satellite motion for steerable beam or moving beam scenarios. gNB needs to manage the common service link TA offset |
| B1) | Broadcast the gateway position to help calculate feeder link TA | The gateway position is fixed (no change as the satellite moves). | Need satellite location/ ephemeris & gateway location at the same layer. Expose satellite & gateway location. Large computational burden (including satellite motion) and power consumption. |
| B2) | Broadcast feeder link TA | Can reuse $N_{TA,\ offset}$ (no need to define another parameter). No need to expose satellite & gateway location. Less computational burden than B1). | Extension of $N_{TA,\ offset}$ (standard impact). The feeder link TA needs to update due to satellite motion. |
| B3) | gNB compensates feeder link TA | No additional overhead at air interface. No additional behaviour at UE. No need to expose satellite & gateway location. | gNB needs to manage the feeder link TA offset. |

Based on the above analysis and comparison in Table 5, the conventional solutions for service link require UE location and other assistance information, which can be a large amount data as the satellite moves. The main reason is that these solutions depend on the distance between UE and satellite, which is calculated based on the locations of them. However, the locations or distances may vary frequently due to satellite movement.

Given the above, embodiments of the present application provide a technical solution for TA compensation, which can efficiently provide TA compensation in scenarios (e.g. NTN) with large propagation delay while considering the movement of the satellite. More details on embodiments of the present application will be illustrated in the following text in combination with the appended drawings.

Considering the high probability of line-of-sight (LOS) propagation in the NTN, other parameters (e.g. reference power) can be used to replace locations when calculating TA. For instance, the TA or rough TA can be derived from pathloss. For the feeder link TA, if it is not compensated by the BS, it may also take advantage of LOS propagation. Additionally, in the case that reference power based solution is not accurate enough, detailed solutions of extending MAC RAR for adjusting TA compensation can also be provided. In other cases, the solutions of extending MAC RAR for adjusting TA compensation may also work independently.

Figure 7:
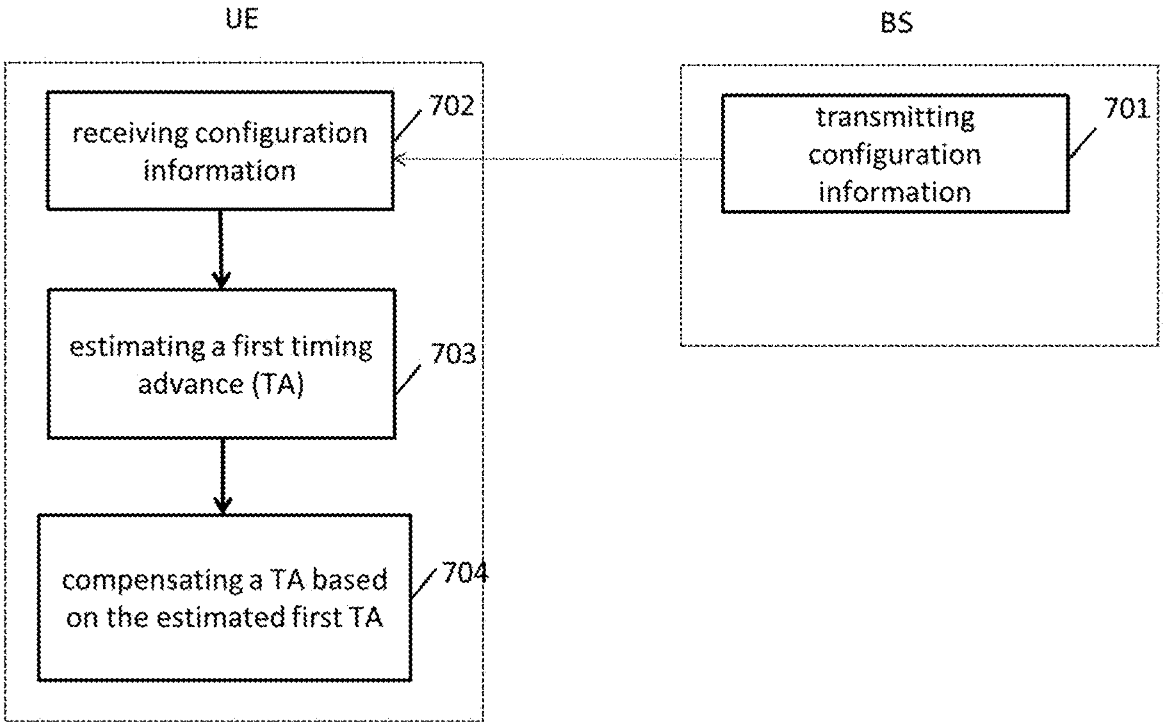
FIG. 7 is a flow chart illustrating a method for TA compensation according to some embodiments of the present application.

FIG. 7 is a flow chart illustrating a method for TA compensation according to some embodiments of the present application. Although the method is illustrated in a system level by a UE (e.g., UE 502 as shown in FIG. 5(*a*) or 5(*b*)) and a BS (e.g., satellite 501 and/or GW 503 as shown in FIG. 5(*a*) or 5(*b*)), persons skilled in the art can understand that the method implemented in the UE and that implemented in the BS can be separately implemented and incorporated by other apparatus with the like functions.

In the exemplary method shown in FIG. 7, in step 701, a first BS (e.g., the satellite 501 or the GW 503) may transmit configuration information indicating a reference power to a UE (e.g., UE 502 shown in FIG. 5(*a*) or 5(*b*)).

In an embodiment of the present application, the reference power may be used for compensating a TA of the UE 502 when initiating a random access procedure with the first BS. In this embodiment, the reference power may be associated with the first BS. For example, the reference power may be associated with a cell belonging to the first BS.

In another embodiment of the present application, the reference power may be used for compensating a TA of the UE 502 when initiating a random access procedure with a second BS (e.g., a satellite or a GW not shown in FIG. 5(*a*) or 5(*b*)) different from the first BS. For example, the second BS may be neighboring to the first BS. In this embodiment, the reference power may be associated with the second BS. For example, the reference power may be associated with a cell belonging to the second BS. In the case that the reference power is associated with the second BS, all of the following parameters are associated with the second BS for compensating a TA of the UE 502 when initiating a random access procedure with the second BS In order to clearly describe the embodiments of the present application, in the embodiments of the present invention, terms such as "first" and "second" are used to distinguish the same or similar items with basically the same function or effect. Persons skilled in the art can understand that the terms "first" and "second" do not limit the order of the base stations.

According to some embodiments of the present application, the configuration information may be included in a radio resource control (RRC) signaling or broadcasted in a system information block (SIB).

According to some embodiments of the present application, the reference power may be determined based on a maximum receiving power associated with the first BS (or the second BS) and an offset, wherein the offset is larger than or equal to zero. In an embodiment of the present application, the reference power may be used for UE specific TA estimation and compensation at UE. In the case that the offset is equal to zero, it means that the reference power may be determined based on a maximum receiving power associated with the first BS (or the second BS). For example, the reference power $P_{reference}=P_{upperbound}+P_{offset}$, wherein $P_{upperbound}$ is the maximum possible receiving power in a cell associated with the first BS (or the second BS) or under the first BS (or the second BS), $P_{offset}$ is an offset for the reference power considering the propagation environment (e.g. weather) and has a value larger than or equal to zero.

According to some other embodiments of the present application, the reference power may be determined based on a receiving power at a reference point associated with the first BS (or the second BS) and an offset, wherein the offset is larger than or equal to zero. In an embodiment of the present application, the reference power may be used for UE specific TA estimation and compensation at UE. In the case that the offset is equal to zero, it means that the reference power may be determined based on a receiving power at a reference point associated with the first BS (or the second BS). For example, the reference power $P_{reference}=P_{location}+P_{offset}$, wherein $P_{location}$ is the receiving power at a reference location associated with the first BS (or the second BS), $P_{offset}$ is an offset for the reference power considering the propagation environment (e.g. weather) and has a value larger than or equal to zero.

According to some other embodiments of the present application, the reference power may be determined based on a transmitting power associated with the first BS (or the second BS) and an offset, wherein the offset is larger than or equal to zero. In an embodiment of the present application, the reference power may be used for service link TA estimation and compensation at UE. In the case that the offset is equal to zero, it means that the reference power may be determined based on the transmitting power associated with the first BS (or the second BS). For example, the reference power $P_{reference}=P_{transmit}+P_{offset}$, wherein $P_{transmit}$ is the transmitting power at the first BS (or the second BS) or at the antenna unit of the first BS (or the second BS), $P_{offset}$ is an offset for the reference power considering the propagation environment (e.g. weather) and has a value larger than or equal to zero.

According to some other embodiments of the present application, the reference power may be determined based on transmitting power at an antenna unit associated with the first BS (or the second BS), a pathless from the first BS (or the second BS) to the antenna unit, and an offset, wherein the offset is larger than or equal to zero. In an embodiment of the present application, the reference power may be used for service link TA and feeder link TA estimation and compensation at UE. In the case that the offset is equal to zero, it means that the reference power may be determined based on transmitting power at an antenna unit associated with the first BS (or the second BS) and a pathless from the first BS (or the second BS) to the antenna unit. For example, the reference power $P_{reference}+P_{transmit}+P_{feeder\_link}+P_{offset}$, wherein $P_{transmit}$ is the transmitting power at the antenna unit of the first BS (or the second BS), $P_{feeder\_link}$ is the power pathloss from the associated BS (i.e., the first BS or the second BS) to its antenna unit (i.e. feeder link), $P_{offset}$ is an offset for the reference power considering the propagation environment (e.g. weather) and has a value larger than or equal to zero.

According to some embodiments of the present disclosure, the first BS may transmit the configuration information when a propagation delay associated with the first BS (or the second BS) is larger than a threshold, and thus the UE 502 may receive the configuration information when a propagation delay associated with the first BS (or the second BS) is larger than a threshold.

According to some embodiments of the present disclosure, the first BS may transmit an indication indicating a presence of the reference power or an enablement of a reference power based TA compensation to the UE 502. In an embodiment of the present application, the BS may transmit the indication when a propagation delay associated with the first BS (or the second BS) is larger than a threshold, and thus the UE 502 may receive the indication when a propagation delay associated with the first BS (or the second BS) is larger than a threshold.

Consequently, at step 702, the UE (for example, the UE 502) may receive the configuration information indicating the reference power.

According to some embodiments of the present application, the UE may consider TA compensation as enabled upon receiving the reference power. In these embodiments, the UE may enable a reference power based TA compensation after receiving the reference power.

According to some embodiments of the present application, the UE may receive the indication indicating a presence of the reference power or an enablement of a reference power based TA compensation from the first BS. In these embodiments, the UE may enable a reference power based TA compensation after receiving the indication.

At receiving the configuration information, at step 703, the UE 502 may estimate a first TA between the UE and the first BS (or the second BS) based on the reference power associated with the first BS (or the second BS).

According to some embodiments of the present application, the UE may derive the first TA from the pathloss, wherein the pathloss is the difference value between the reference power and the receiving power at the UE 502. In an embodiment of the present application, the first TA may be estimated based on the reference power, a receiving power at the UE, and a pathloss function.

For example, the UE may estimate the first TA (e.g., $TA_{estimation}$) according to the following equation (1) but not limited to it:

$$TA_{estimation} = g(f, P_{reference} - P_{receive})/c \quad (1)$$

Wherein $P_{reference}$ is the reference power associated with the first BS (or the second BS), $P_{receive}$ is the receiving power measured at the UE from the associated BS, g(*) is the inverse function of a pathloss function/channel model $P_{pathloss}=h(f, d)$ with a variable f as the frequency and d as the distance between the UE and the BS, and c is the speed of light.

For example, the free space path loss (FSPL) in dB for a distance d in meter and frequency fin GHz is given by the following equation (2):

$$P_{pathloss} = h(f, d) = 32.45 + 20\log_{10}(f) + 20\log_{10}(d) \quad (2)$$

Accordingly, the distance d may be determined based on the following equation (3):

$$d = g(f, P_{reference} - P_{receive}) = 10^\wedge\left[(P_{reference} - P_{receive} - 32.45 - 20\log_{10}(f))/20\right] \quad (3)$$

After determining the distance d, the first TA (e.g., $TA_{estimation}$) may be determined based on the above equation (1).

After estimating the first TA value, at step 704, the UE 502 may compensate the TA based on the estimated first TA when initiating a random assess procedure to the first BS (or the second BS).

According to some embodiments of the present application, the UE may compensate the first TA when initiating a random access procedure to the first BS (or the second BS).

According to some embodiments of the present application, the UE 502 may determine a second TA based on the estimated first TA and a second offset, wherein the second offset is larger than or equal to zero. For example, the second TA may be the first TA plus or minus the second offset. In the case that the second offset is equal to zero, the second TA is the first TA. In an embodiment of the present application, the UE may compensate the second TA when initiating a random access procedure to the first BS (or the second BS).

According to some other embodiments of the present application, the UE 502 may determine a second TA based on the estimated first TA and a second offset, wherein the second offset is larger than or equal to zero. Then the UE 502 may determine a total TA based on the second TA and at least one of a current TA parameter (e.g., $N_{TA}$ specified in 3GPP TS 38.213) and a current TA offset (e.g., $N_{TA,offset}$ specified in 3GPP TS 38.133). After that, the UE may compensate the total TA when initiating a random access procedure to the first BS (or the second BS).

For example, the UE may include the second TA in $N_{TA}$ as defined in 3GPP TS38.213 when calculating the total TA (e.g. total $TA=(N_{TA}+N_{TA,offset})T_c$). In another example, the UE may include the second TA in $N_{TA,offset}$, defined in 3GPP TS 38.133 when calculating the total TA (e.g. total $TA=(N_{TA}+N_{TA,offset})T_c$). In yet another example, the UE may use the compensated TA as an independent parameter (e.g. $TA_{pre\text{-}compensation}$) when calculating the total TA (e.g. total $TA=TA_{pre\text{-}compensation}+(N_{TA}+N_{TA,offset})T_c$).

According to some embodiments of the present application, the TA may be compensated when transmitting a random access preamble (e.g., Msg1) in a 4-step random access procedure. According to some other embodiments of the present application, the TA may be compensated when transmitting a random access preamble and uplink data transmission (e.g., MsgA) in a 2-step random access procedure. In an embodiment of the present application, the uplink data transmission may be the physical uplink shared channel (PUSCH) transmission.

The compensated TA when initiating a random access procedure to the first BS (or the second BS) may not accurate enough. According to some embodiments of the present application, the TA may be further adjusted through a MAC RAR. However, adjusting the TA through a MAC RAR may work independently, without requiring preforming TA compensation when initiating a random access procedure.

Figure 8:
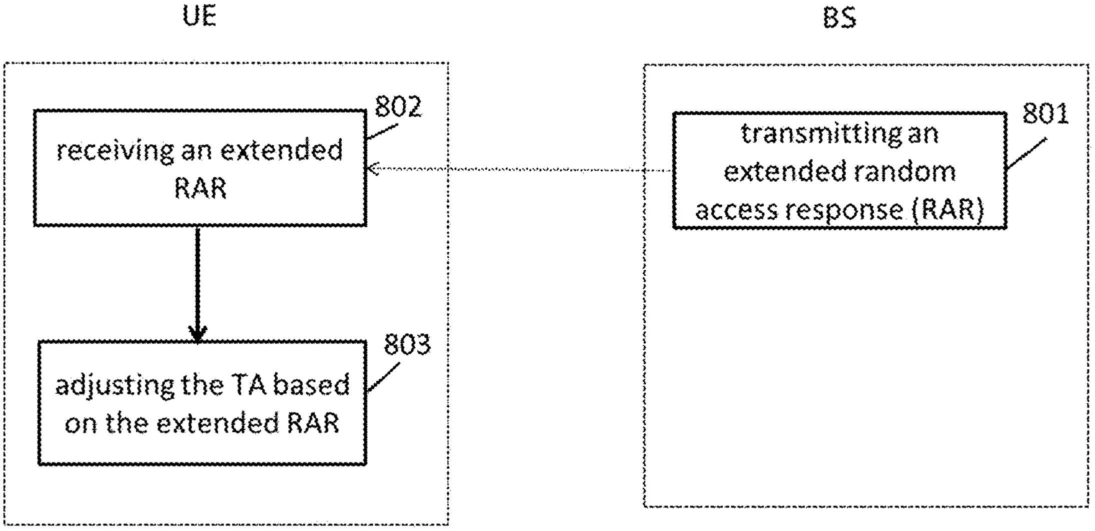
FIG. 8 is a flow chart illustrating a method for TA compensation according to some other embodiments of the present application.

For example, FIG. 8 is a flow chart illustrating a method for TA compensation according to some other embodiments of the present application.

In the exemplary method shown in FIG. 8, in step 801, a BS (e.g., the satellite or the GW) may transmit an extended RAR for adjusting the TA of the UE (for example, the UE 502). In an embodiment of the present application, the BS may be the first BS or the second BS as stated in FIG. 7.

In an embodiment of the present application, the BS may transmit an indication indicating an existence of the extended RAR. The indication may be included in the extended RAR, in a SIB, or in a RRC signaling. For example, the reserved bit in the extended RAR may be used as the indication.

Consequently, in step 802, the UE 502 may receive the extended RAR for adjusting the TA from the BS. Then, in step 803, the UE 502 may adjust the TA based on the extended RAR.

According to some embodiments of the present application, the extended MAC RAR includes an extended timing advance command (TAC) field having 12+8*X bits, wherein X is a positive integer. Then, after receiving the extended RAR, at step 803, the UE 502 may adjust the TA based on a value indicated in the extended TAC field.

Figure 9:
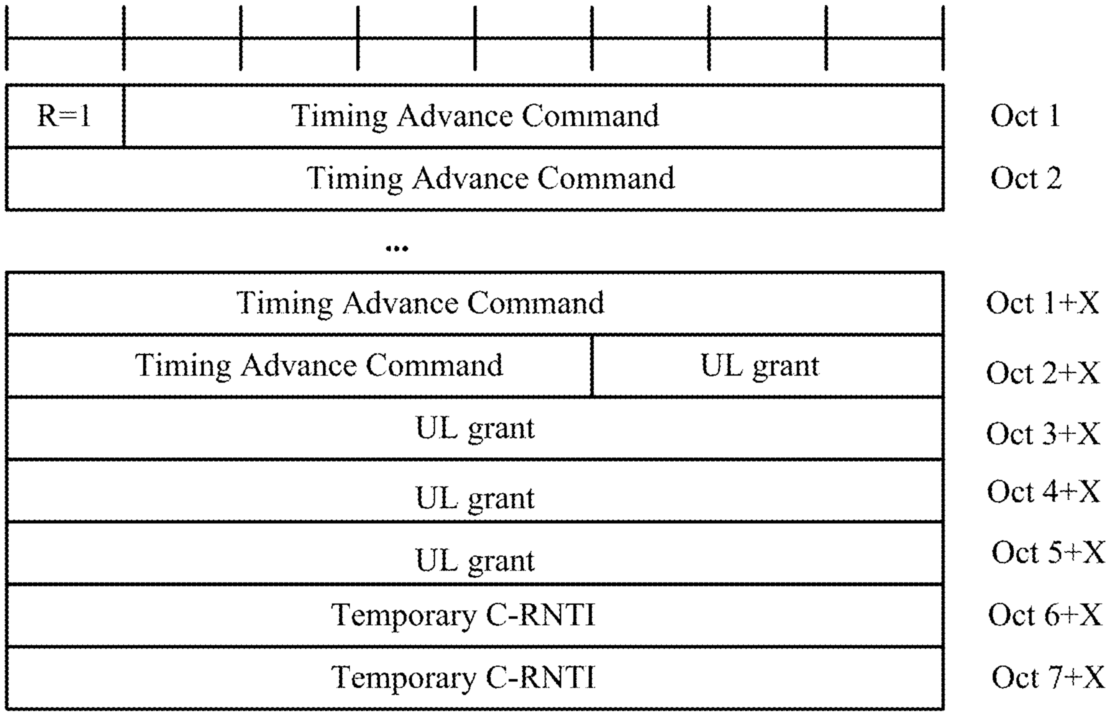
FIG. 9 illustrates an example of an extended MAC RAR according to some embodiments of the present application.

For example, FIG. 9 illustrates an example of extended MAC RAR according to some embodiments of the present application. Referring to FIG. 9, the size of the MAC RAR is 8*(7+X) bits. The MAC RAR includes a reserved field with 1 bit, which is represented by "R" in FIG. 3, a TAC field with 12+8*X bits, a UL grant field with 3+8*3 bits, and a temporary cell-radio network temporary identifier (C-RNTI) field with 8*2 bits. In the example of FIG. 9, the reserved field may be set to 1 (e.g., R=1), which indicates that the MAC RAR is an extended MAC RAR.

Since the TAC field is extended to 12+8*X bits, it may indicate a relatively large TA value compared with the normal MAC RAR in FIG. 3. After receiving the extended MAC RAR, the UE may adjust its TA compensation as indicated in the received TAC (from Oct1 to Oct1+X) in the extended MAC RAR.

According to some embodiments of the present application, the UE may obtain a scaling factor for adjusting the TA, wherein the scaling factor is predefined in the UE, received in a RRC signaling or in a SIB. After receiving the scaling factor, the UE may determine a first value to be the scaling factor multiplying a second value indicated in a TAC field of the extended RAR. In an embodiment of the present application, the UE may adjust the TA based on the first value. In another embodiment of the present application, the UE may receive a normal RAR (e.g., the RAR as shown in FIG. 3) after receiving the extended RAR, then the UE 502 may adjust the TA based on the first value and the third value indicated in a TAC field of the normal RAR.

For example, FIG. 10 illustrates another example of extended MAC RAR according to some embodiments of the present application. The extended MAC RAR shown in FIG. 10 may be used together with the scaling factor to determine the first value.

Referring to FIG. 10, the difference between the extended MAC RAR and the normal MAC RAR in FIG. 3 is that the reserved field in the extended MAC RAR may be set to 1 (e.g., R=1), which indicates that the MAC RAR is an extended MAC RAR. The extended MAC RAR can be used together with the scaling factor to determine the first value.

After receiving the extended MAC RAR, in an embodiment, the UE 502 may determine the first value to be the scaling factor (e.g., N, wherein N is a positive integer) multiplying the value indicated in the TAC filed (e.g., from Oct1 to Oct2) in the extended MAC RAR. Then, the UE may adjust its TA compensation as the first value.

In another embodiment, the UE may continue to receive a normal MAC RAR (e.g., the MAC RAR shown in FIG. 3) after receiving the extended MAC RAR (e.g., the MAC RAR shown in FIG. 10). The UE may consider the RAR reception successful only after receiving a normal MAC RAR. In this embodiment, the UE 502 may determine the first value to be the scaling factor (e.g., N, wherein N is a positive integer) multiplying a second value indicated in the received TAC (e.g., from Oct1 to Oct2) in the extended MAC RAR, then the UE 502 may adjust its TA compensation as the first value plus the third value indicated in the TAC (e.g., from Oct1 to Oct2) in the normal MAC RAR.

In yet another embodiment, the UE may not use the scaling factor with the extended MAC RAR as shown in FIG. 10 to adjust the TA. Instead, the UE may receive more than one extended MAC RAR as shown in FIG. 10, then the UE 502 may add all the values indicated in the TAC fields in the more than one extended MAC RAR to obtain a sum of the TA values, such that the UE may adjust the TA compensation to be the sum of the TA values.

Figure 11:
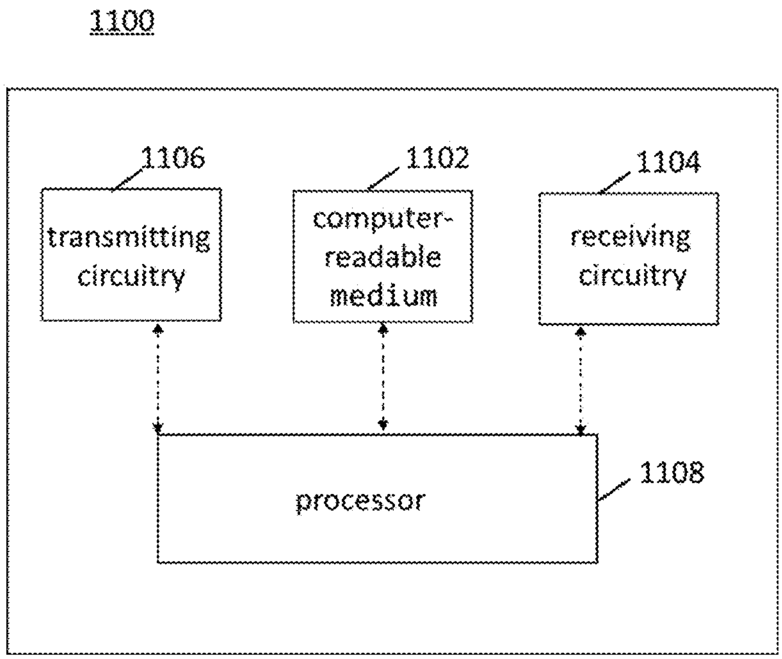
FIG. 11 illustrates a simplified block diagram of an apparatus for TA compensation according to some embodiments of the present application.

FIG. 11 illustrates a simplified block diagram of an apparatus for TA compensation according to some embodiments of the present application. The apparatus 1100 may be a UE (for example, the UE 502) as shown in FIG. 5(*a*) or 5(*b*).

Referring to FIG. 11, the apparatus 1100 may include at least one non-transitory computer-readable medium 1102, at least one receiving circuitry 1104, at least one transmitting circuitry 1106, and at least one processor 1108. In some embodiment of the present application, at least one receiving circuitry 1104 and at least one transmitting circuitry 1106 and be integrated into at least one transceiver. The at least one non-transitory computer-readable medium 1102 may have computer executable instructions stored therein. The at least one processor 1108 may be coupled to the at least one non-transitory computer-readable medium 1102, the at least one receiving circuitry 1104 and the at least one transmitting circuitry 1106. The computer executable instructions can be programmed to implement a method with the at least one receiving circuitry 1104, the at least one transmitting circuitry 1106 and the at least one processor 1108. The method can be a method according to an embodiment of the present application, for example, the method shown in FIG. 7 or FIG. 8.

Figure 12:
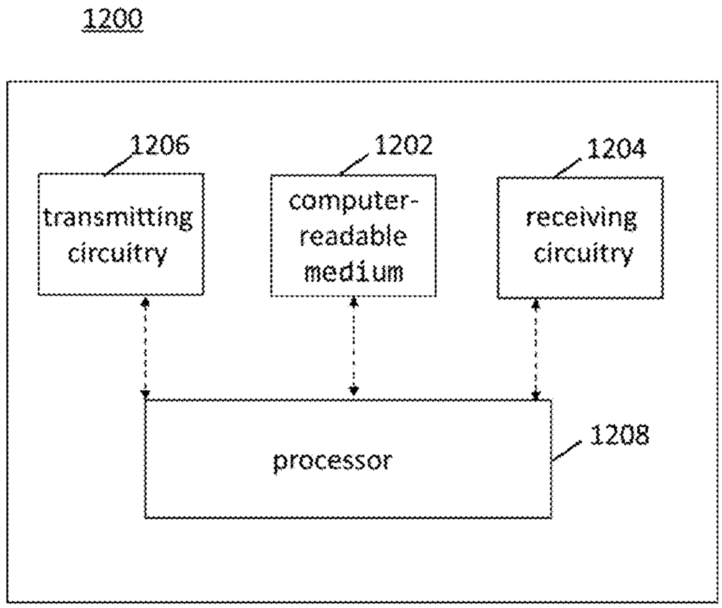
FIG. 12 illustrates a simplified block diagram of an apparatus for TA compensation according to some other embodiments of the present application.

FIG. 12 illustrates a simplified block diagram of an apparatus for TA compensation according to some other embodiments of the present application. The apparatus 1200 may be a BS (for example, a satellite 501 or a GW 503 as shown in FIG. 5(*a*) or 5(*b*)).

Referring to FIG. 12, the apparatus 1200 may include at least one non-transitory computer-readable medium 1202, at least one receiving circuitry 1204, at least one transmitting circuitry 1206, and at least one processor 1208. In some embodiment of the present application, at least one receiving circuitry 1204 and at least one transmitting circuitry 1206 and be integrated into at least one transceiver. The at least one non-transitory computer-readable medium 1202 may have computer executable instructions stored therein. The at least one processor 1208 may be coupled to the at least one non-transitory computer-readable medium 1202, the at least one receiving circuitry 1204 and the at least one transmitting circuitry 1206. The computer executable instructions can be programmed to implement a method with the at least one receiving circuitry 1204, the at least one transmitting circuitry 1206 and the at least one processor 1208. The method can be a method according to an embodiment of the present application, for example, the method shown in FIG. 7 or FIG. 8.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A user equipment (UE) for wireless communication, comprising:

at least one memory; and at least one processor coupled with the at least one memory and configured to cause the UE to:

receive configuration information indicating a reference power;

estimate a first timing advance (TA) between the UE and a first base station (BS) based on the reference power;

receive an extended random access response (RAR) for adjusting the estimated first TA; and determine a second TA based on the adjusted first TA and an offset that is larger than or equal to zero;

determine a total TA based on the determined second TA and at least one of a current TA parameter and a current TA offset; and compensate a TA, based on the determined total TA, when initiating a random access procedure to the first BS.

2. The UE of claim 1, wherein the configuration information is included in a radio resource control (RRC) signaling or broadcasted in a system information block (SIB).

3. The UE of claim 1, wherein the configuration information is received from a second BS different from the first BS.

4. The UE of claim 1, wherein the reference power is determined based on a maximum receiving power associated with the first BS and an offset, wherein the offset is larger than or equal to zero.

5. The UE of claim 1, wherein the reference power is determined based on a receiving power at a reference point associated with the first BS and an offset, wherein the offset is larger than or equal to zero.

6. The UE of claim 1, wherein the reference power is determined based on a transmitting power associated with the first BS and an offset, wherein the offset is larger than or equal to than zero.

7. The UE of claim 1, wherein the reference power is determined based on a transmitting power at an antenna unit associated with the first BS, a pathloss from the first BS to the antenna unit, and an offset, wherein the offset is larger than or equal to zero.

8. The UE of claim 1, wherein, to estimate the first TA between the UE and the first BS, the at least one processor is configured to cause the UE to:

estimate the first TA based on the reference power, a receiving power at the UE, and a pathloss function.

9. The UE of claim 1, wherein the TA is compensated when transmitting a random access preamble in a 4-step random access procedure.

10. The UE of claim 1, wherein the TA is compensated when transmitting a random access preamble and an uplink transmission in a 2-step random access procedure.

11. The UE of claim 1, wherein the configuration information is received at the UE when a propagation delay associated with the first BS is larger than a threshold.

12. The UE of claim 1, wherein the at least one processor is further configured to cause the UE to:

enable a reference power based TA compensation after receiving the reference power.

13. The UE of claim 1, wherein the at least one processor is further configured to cause the UE to:

receive an indication indicating a presence of the reference power or an enablement of a reference power based TA compensation;

enable the reference power based TA compensation after receiving the indication.

14. A method performed by user equipment (UE), the method comprising:

receiving configuration information indicating a reference power;

estimating a first timing advance (TA) between the UE and a first base station (BS) based on the reference power;

receiving an extended random access response (RAR) for adjusting the estimated first TA; and determining a second TA based on the adjusted first TA and an offset that is larger than or equal to zero;

determining a total TA based on the determined second TA and at least one of a current TA parameter and a current TA offset; and compensating a TA, based on the determined total TA, when initiating a random access procedure to the first BS.

15. The method of claim 14, wherein the configuration information is included in a radio resource control (RRC) signaling or broadcasted in a system information block (SIB).

16. The method of claim 14, wherein the configuration information is received from a second BS different from the first BS.

17. A user equipment (UE) for wireless communication, comprising:

at least one memory; and at least one processor coupled with the at least one memory and configured to cause the UE to:

receive configuration information indicating a reference power;

estimate a first timing advance (TA) between the UE and a first base station (BS) based on the reference power; and determine a second TA based on the estimated first TA and an offset that is larger than or equal to zero;

determine a total TA based on the determined second TA and at least one of a current TA parameter and a current TA offset; and compensate a TA when initiating a random access procedure to the first BS, wherein the TA is compensated based on the determined total TA and based on the estimated first TA being adjusted via an extended random access response (RAR).

18. The UE of claim 17, wherein the configuration information is included in a radio resource control (RRC) signaling or broadcasted in a system information block (SIB).

19. The UE of claim 17, wherein the configuration information is received from a second BS different from the first BS.

20. The UE of claim 17, wherein, to estimate the first TA between the UE and the first BS, the at least one processor is configured to cause the UE to:

estimate the first TA based on the reference power, a receiving power at the UE, and a pathloss function.

* * * * *